United States Patent [19]

Moncrief et al.

[11] Patent Number: 5,522,206
[45] Date of Patent: Jun. 4, 1996

[54] SELF FASTENING GUIDE FOR GUIDE RAILS

[75] Inventors: Frank N. Moncrief, Acworth; Randall L. Stauffer, Douglasville, both of Ga.

[73] Assignee: Riverwood International Corporation, Atlanta, Ga.

[21] Appl. No.: 238,993

[22] Filed: May 6, 1994

[51] Int. Cl.⁶ ............................................ B65B 35/30
[52] U.S. Cl. .............................. 53/543; 53/251; 53/252; 53/534; 29/453; 198/836.1; 198/836.4
[58] Field of Search .................... 29/453; 198/836.1, 198/836.3, 836.4; 53/48.1, 393, 251, 252, 443, 448, 458, 475, 534, 543, 566

[56] References Cited

U.S. PATENT DOCUMENTS

| | | | |
|---|---|---|---|
| 2,592,130 | 4/1952 | Erb et al. | 29/453 |
| 2,876,485 | 3/1959 | Cowles | 29/453 |
| 3,110,068 | 11/1963 | Perrochat | 29/453 |
| 3,217,524 | 10/1965 | Prather et al. | 29/453 |
| 3,285,428 | 11/1966 | Scheck | 29/453 |
| 3,471,903 | 11/1969 | Northrup et al. | 29/453 X |
| 3,491,873 | 1/1970 | Fauth | 198/836.1 |
| 3,669,244 | 6/1972 | Pagdin et al. | 198/836.3 X |
| 3,737,972 | 6/1973 | Smoot | 29/453 |
| 3,745,736 | 7/1973 | Fischer et al. | 29/453 X |
| 3,788,457 | 1/1974 | Valentino | 198/836.1 |
| 4,286,642 | 9/1981 | Keatley | 29/453 X |
| 4,470,499 | 9/1984 | Sijbrandij | 198/836.3 |
| 5,082,108 | 1/1992 | Douglas | 198/836.4 |

Primary Examiner—John Sipos
Assistant Examiner—Daniel Moon

[57] ABSTRACT

A self fastening plastic guide for attachment to a metal guide rail having openings formed therein has a first guide member and a second guide member. The guide members are provided with protruding locking tangs that lock the members to each other when the locking tangs are snapped together. In use, the first and second guide members are snapped together with their tangs extending through the openings in the guide rail to secure the guide to the rail.

11 Claims, 2 Drawing Sheets

1

SELF FASTENING GUIDE FOR GUIDE RAILS

TECHNICAL FIELD

This invention relates generally to guide rails of the type used to herd beverage containers toward waiting open cartons in a beverage container packaging machine. More particularly, the invention contemplates an improved plastic guide adapted to be fastened along the length of such guide rails to reduce friction between the rails and the moving containers, protect the container labels from abrasion, and reduce the noise of machine operation.

BACKGROUND OF THE INVENTION

This invention is particularly useful in beverage container packaging machines such as that shown and disclosed in the inventors co-pending patent application Ser. No. 08/118,111 filed Sep. 2, 1993, the disclosure of which is incorporated herein by reference for purposes of providing an adequate background for the present invention. Even though the present invention will be described in the context of such a packaging machine, it should be understood that the invention has application wherever plastic bumpers or guides are to be affixed to a metal rail or frame.

As disclosed in the above referenced patent application, in beverage container packaging machines, containers such as cans or bottles typically are conveyed in mass along a conveyor toward a packaging section of the machine. As the containers approach the packaging section, they encounter a plurality of lanes formed by an array of spaced metal rails. The rails function to herd the containers into the lanes and to direct them laterally toward the packaging mechanism. Although the detailed operation of packaging machines can vary dramatically, most utilize this type of guide rail assembly to align the containers and herd them in the appropriate direction for packaging.

When employing guide rails to herd beverage containers in a packaging machine, it is desirable to affix a plastic bumper or guide to each rail extending along the length thereof. Usually, these guides are configured as narrow strips that extend along the upper edge or the upper and lower edge portions of each rail. The guides serve a number of purposes. Since they are usually fabricated of a low friction plastic material such as teflon, the guides reduce significantly the friction between the moving beverage containers and the guide rails as the containers progress along the lanes. This enhances the efficiency of the packaging process and helps to prevent jams that otherwise can occur. Further, the guides are narrower and far less abrasive than the metal rails to which they are attached. Accordingly, they do not tend to abrade or scrape the painted or paper labels from the beverage containers as the containers move along the lanes. The labels and other indicia on the containers are thus protected by the plastic guides. In addition, the guides reduce significantly the operating noise of the machine by preventing the beverage containers from banging against the metal rails as the containers move along their lanes.

In the past, plastic guides have been attached to their metal rails by a variety of methods. In some instances, the guides and the rails have been machined and threaded at spaced intervals along their lengths. The guides are then affixed to the rails by flat headed bolts that are threaded into the rails with their heads countersunk into the guides to avoid an obtrusion. While this method works, its implementation is labor intensive, requiring perhaps hundreds of individual holes to be drilled, tapped, and countersunk in the guides and rails for receiving the bolts. Further, the requirement of separate bolts adds cost, increases the time required to affix the guides to their rails, and can become a problem since the bolts can work loose and their countersunk heads tend to collect dirt. In addition, the guides must be thick enough to accommodate the countersunk heads, requiring more material and impacting the spacing between adjacent rails.

In another method of affixing the guides to their rails, the rails are machined to have spaced tangs that extend upwardly from the top edges of the rails. The plastic guide members are then formed to extend along the top edges of the rails and are machined with slots that receive the spaced tangs of the rails. The tangs are bored and threaded and flat headed bolts are used to fix the guides to their rails at the positions of the tangs. As with the previous method, this method is labor intensive since the rails must be machined to exhibit tangs and the tangs and guides must be machined and threaded to receive the attaching bolts. Each of the many bolts must be separately installed, requiring significant time, and the bolts can come loose over time. The plastic guides might also be bonded directly to their metal rails with an appropriate adhesive. However, such bonding is prohibitively expensive and can require a significant investment of time and resources.

Clearly, there exists a need for an improved plastic guide assembly that fastens quickly, easily, and securely along the length of metal guide rails, that imposes minimum machining requirements for its attachment to the rail, is thinner than prior art guides, and that requires no screws or additional hardware for attachment. It is to the provision of such a self fastening guide for guide rails that the present invention is primarily directed.

SUMMARY OF THE INVENTION

Briefly described, the present invention, in a preferred embodiment thereof, comprises a self fastening plastic guide for attachment along the length of metal guide rails in a beverage container packaging machine. The guide is preferably fabricated by an extrusion process and is formed in two halves, designated herein as first and second guide members. Each of the first and second guide members takes the form of a long strip with a mounting surface designed to rest against the rail and a bearing surface against which beverage containers bear. A plurality of spaced apart tongues extend inwardly from the mounting surface of the second guide member. A corresponding plurality of pairs of spaced fingers extend inwardly from the mounting surface of the first guide member. The fingers of each of the pairs of fingers are spaced to define a groove therebetween. The finger pairs are spaced apart along the length of the first guide member a distance equal to the spacing between the tongues of second guide member. The tongues and their corresponding grooves are stepped or contoured such that the tongues snap into locking engagement with the grooves when the first and second guide members are forced together.

A metal guide rail to which the guide assembly of this invention is attached is machined along its length with a plurality of spaced apart slots that are aligned along the rail at the location where the guide is to be mounted. The slots correspond in their spacing to the spacing of the tongues and grooves along the length of the guide members and are just slightly wider than the width of the finger pairs of the first guide member. The guide is fastened to the rail by snapping the first and second guide members together with their tongues and grooves extending through the slots in the rail. Since the width of the slots in the rail are only slightly wider than the fingers forming the grooves, the fingers are prevented by the slots from spreading apart once the halves of the guide members are snapped together on the rail. Accordingly, once snapped into place, the plastic guide of this invention becomes securely locked in position and can be removed only by prying and disfiguring the guide. The guide is thus not likely to work loose during use.

In the preferred embodiment of this invention, the strip-shaped guide members are cupped slightly inwardly. The tongues and corresponding grooves are sized such that the tongues snap into the grooves within the rail slots only when the cupped guide members are pressed firmly and flattened against the surface of the metal rail. In this way, the outer edges of the guide members are held firmly against the rail so that they cannot protrude and interfere with beverage containers as the containers move along the lanes formed by the guide rails.

Accordingly, the present invention embodies a self fastening guide for guide rails that is unique in its construction and operation, that addresses the problems of prior art guides, and that represents a significant advance in the art.

It is thus an object of this invention to provide a self fastening plastic guide for guide rails that is simple and economical to manufacture through a simple extrusion process.

It is a further object of the invention to provide a self fastening guide for guide rails that fastens securely to the rail in one quick operation.

Another object of the invention is to provide an improved guide and guide rail assembly that imposes minimum machining requirements for attachment of the guide to the rail.

A still further object of the invention is to provide a guide that attaches to its rail without the need for screws, bolts, or any other auxiliary fastening hardware.

An additional object of the invention is to improve the manufacturing efficiency of guide rails of the type used to form lanes in a beverage container packaging machine.

These and other objects, features, and advantages of this invention will become more apparent upon review of the detailed description set forth below taken in conjunction with the accompanying drawings, which are briefly described as follows.

DETAILED DESCRIPTION OF THE PREFERRED EMBODIMENT

Figure 1:
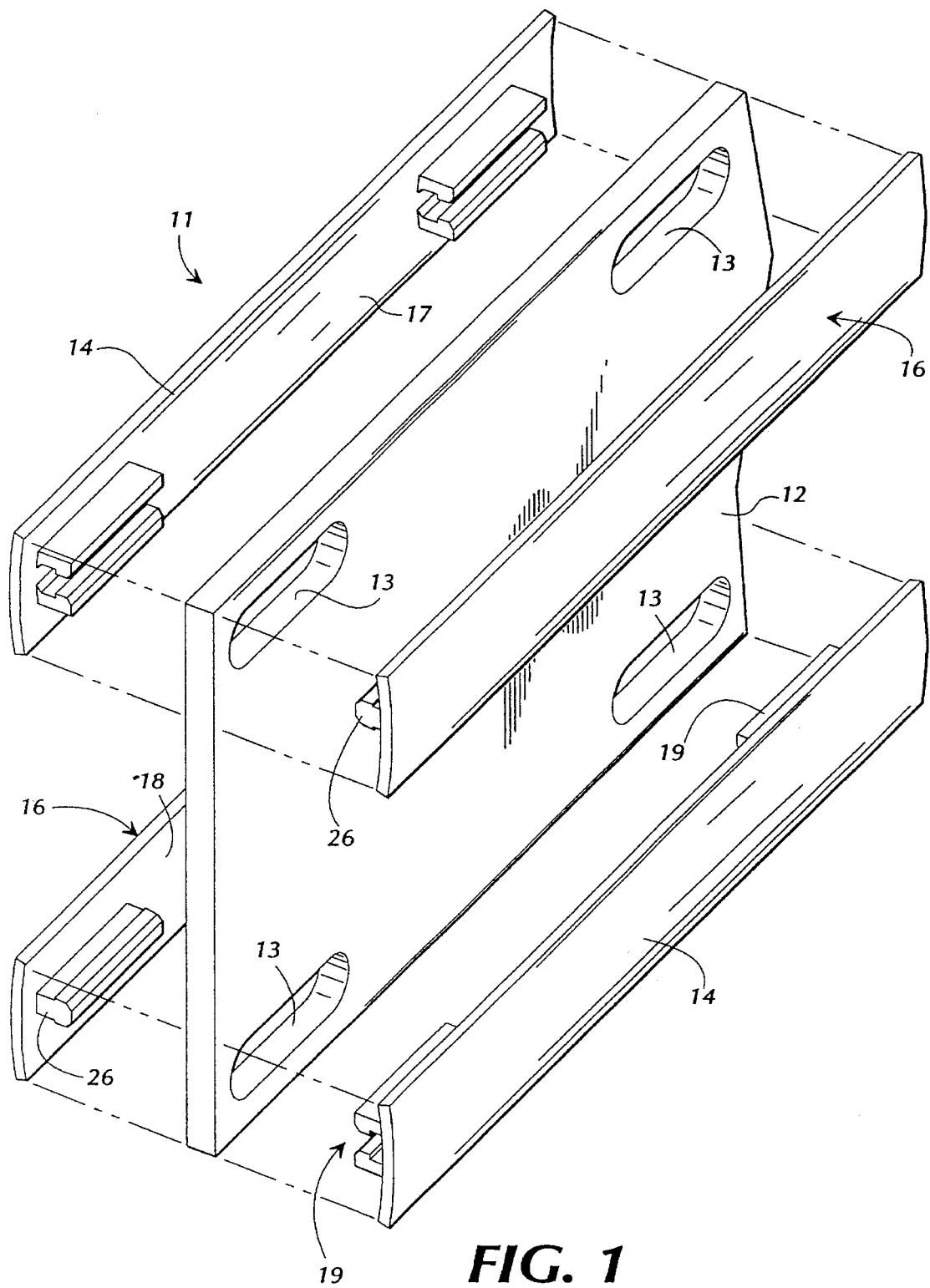
FIG. 1 is a perspective exploded view of a self fastening guide for guide rails that embodies principals of the present invention in a preferred form.
Figure 2:
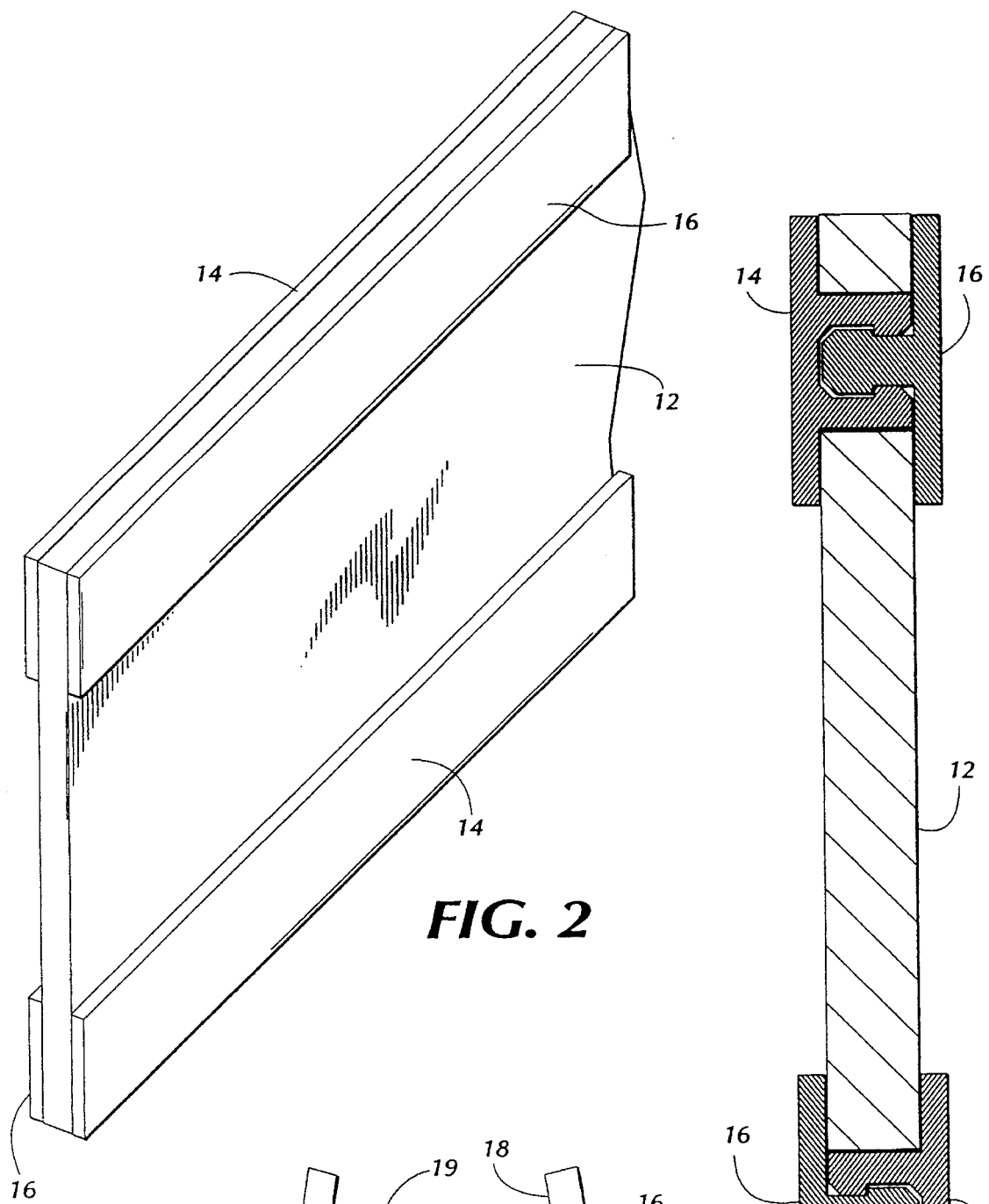
FIG. 2 is a perspective view of the guide rail assembly of FIG. 1 showing the guide members fixed to the rail.

Referring now in more detail to the drawings, in which like numerals refer to like parts throughout the several views, FIG. 1 illustrates a guide rail assembly that embodies principals of the present invention in a preferred form. While the assembly of FIG. 1 shows only a short portion of a guide rail, it will be understood that in an actual beverage container packaging machine, such rails often are several feet long.

The guide rail assembly 11 comprises a rail 12 that, in the illustrated embodiment, is formed from a long flat plate of aluminum or other suitably rigid material. The rail 12 is formed to define openings or slots 13 that are spaced apart and aligned along the top and bottom edge portions of the rail 12. During fabrication of the rails 12, the slots 13 can be milled in the rails or, preferably, stamped in the rails with a metal stamping jig. In this way, the slots 13 are formed in the rails with a minimum of additional machining time and cost.

Plastic guide assemblies are adapted to be fixed to the rail 12 extending along the top and bottom edge portions thereof. The guide assemblies engage beverage containers moving adjacent to the guide rail to reduce noise, friction, and abrasion that otherwise can occur to the containers. Each of the guide assemblies comprises a first guide member 14 and a second guide member 16 that, when attached to the rail 12, extend along opposite sides thereof. Each of the first guide members 14 is shaped generally as an elongated strip having an inner or mounting surface 17 adapted to bear against the rail 12 when the guide assembly is fixed thereto. Similarly, each of the second guide members 16 is formed as an elongated strip having a mounting surface 18 that bears against the rail 12 when the assembly is attached to the rail.

A plurality of pairs of spaced fingers 19 protrude inwardly from the mounting surface 17 of each of the first guide members 14. The pairs of fingers 19 are spaced to align with the slots 13 that are formed in the rail 12. The fingers 19 of each of the pairs of fingers are spaced apart and have inwardly opposed surfaces 21 and 22 that define a groove, generally indicated at 24 (see FIG. 3). Each of the fingers has a distal end 23 and the opposed surfaces 21 and 22 of the fingers are contoured or stepped to define a narrow neck portion of the groove 24 adjacent to the distal ends of the fingers and a relatively wider throat portion of the groove 24 inwardly displaced from the distal ends of the fingers. The fingers 19 thus form a catch with a locking function that is described in more detail below.

A plurality of tongues 26 protrude inwardly from the mounting surfaces of the second guide members 16. The tongues 26 are also spaced to be aligned with the slots 13 in the rail 12 and thus to be aligned with the fingers 19 on the first guide members 14. Each of the tongues 26 has a distal end 27 and a stem portion 28. Each tongue 26 is contoured so that the distal end 27 is wider than the stem portion 28. Further, as best seen in FIGS. 3 and 4, the shape of each tongue 26 matches the contoured shape of a corresponding groove 24 formed by the fingers 19 on the first guide member 14.

With the just described configuration of the fingers 19 and the tongues 26, it can be seen that together these elements form a locking tongue and groove mechanism that snaps together when the tongues 26 are inserted into the grooves 24. Specifically, as the distal end 27 of each tongue moves past the neck portion of a corresponding groove, the fingers 19 spread apart to allow the neck portion to pass until it becomes lodged in the wider throat portion of the groove 24. At this point, the fingers spring back into position locking the distal end of the tongue securely in place as best illustrated in FIG. 4. Thus, the first and second guide members are self-fastening and require no auxiliary fasteners such as screws and bolts for their attachment to each other.

In use, the first and second guide members 14 and 16 are positioned along a corresponding rail 12 with their fingers and tongues aligned with the slots 13 formed in the rail, as best seen in FIG. 1. The first rail member 14 is then moved into position along the surface of the rail 12 with its pairs of fingers 19 extending through the slots 13 formed in the rails. The second guide members 16 are then moved and pressed firmly into position along the rail on the opposite side of the first guide member. As the second guide member 16 is moved into position, its tongues 26 slip into the slots 24 formed by the corresponding fingers 19 until the tongues snap into locked engagement within the grooves. At this point, the first and second guide members 14 and 16 are securely locked together extending along an edge portion of the rail 12 to provide a bumper or guide for beverage containers moving along the rail. The installation procedure is quick, simple, requires a minimum of labor, and forms a firm secure attachment of the guides to the rail.

Figure 3:
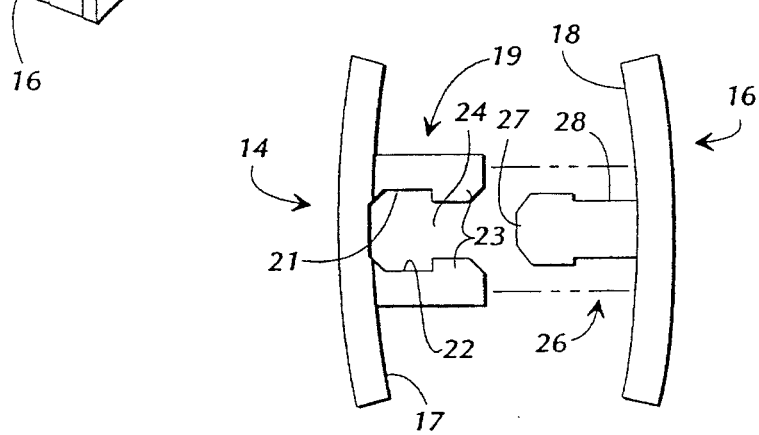
FIG. 3 is an end elevational view of the guide assembly of this invention illustrating the contoured tongues and grooves of the guide members.
Figure 4:
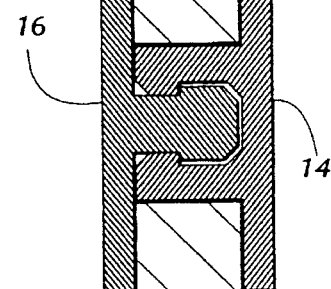
FIG. 4 is a cut-away sectional end view of the rail and guide assembly showing the relationship between the tongues, grooves, and slots with the guide members fixed to a rail.

As best illustrated in FIG. 3, the first and second guide members 14 and 16 are formed to be cupped slightly inwardly toward their respective mounting surfaces 17 and 18. Since the guides are formed of a plastic material, they are substantially rigid but yet somewhat flexible. The lengths of the tongues 26 and the contours on the opposing surfaces of the fingers 19 are sized so that the tongues 26 do not lock into place in the grooves 24 until the cupped shaped guides are pressed tightly against the rails 12 so that their cupped shape is flattened out against the rails. In this way, the edges of the guide members 14 and 16 are held tightly by the locked tongues and grooves against the surface of the rail 12 so that they do not protrude and form an obstacle to containers moving past the rail. This configuration also insures that the guides are held by the spring action of the cupped guide members firmly onto the rail 12 so that they do not become loose and move around during operation of a packaging machine.

Finally, as best seen in FIG. 4, the dimensions of each finger pair 19 are formed to be just slightly less than the width of their corresponding slot 13 in the rail 12. In this way, once the tongues 26 are forcibly snapped into locking engagement in the grooves 24, the fingers 19 are constricted by the walls of the slots 13 and are prevented from spreading apart within the slots. With this configuration, the tongues 26 become securely locked within the slots 24 and cannot be removed except by substantial force that deforms the tongues or the fingers. Thus, the guides of this invention are easily fixed to their corresponding rails during fabrication of the rails but nevertheless become irretrievably locked in position so that they do not become loose over time. In addition, since the guides do not have to be thick enough to accommodate countersunk screw heads, the guides can be made thin, thus decreasing the overall thickness of the guide rail.

The invention has been disclosed through the forgoing description of a specific preferred embodiment. It will be understood by those of skill in the art, however, that various other configurations embodying the invention are possible and that the invention itself is not limited by the details of preferred embodiment disclosed herein. Numerous additions, deletions, and modifications may well be made to the illustrated embodiment without departing from the spirit and scope of the invention as set forth in the following claims.

We claim:

1. A self fastening guide for attachment to a rail having opposed planar surfaces and at least one opening formed through said surfaces, said guide comprising:

first and second guide members each having a mounting surface adapted to engage one of the planar surfaces of the rail when said guide is attached to said rail and a bearing surface for contacting articles traveling along said rail;

a pair of spaced fingers extending from the mounting surface of said first guide member and into the opening formed in the rail;

said fingers having opposed contoured surfaces forming a groove in the region between said fingers; and a tongue extending from the mounting surface of said second guide member and into the groove;

said tongue being contoured to mate with the opposed contoured surfaces of said fingers when inserted into said groove to lock said tongue into position in said groove;

said mounting surfaces of said first and second guide members engaging the rail on either side of the opening when said tongue is inserted and locked into said groove within the opening.

2. A self fastening guide as claimed in claim 1 and wherein said fingers have distal ends and wherein said opposed contoured surfaces of said fingers are stepped to form an enlarged throat portion of said groove inwardly displaced from the distal ends of said fingers and a narrower neck portion of said groove adjacent to the distal ends of said fingers.

3. A self fastening guide as claimed in claim 2 and wherein said tongue of said second guide member has a distal end and wherein said tongue is stepped to form an enlarged portion at the distal end of said tongue and a narrower stem portion inwardly displaced from the distal end of said tongue, said enlarged portion of said tongue substantially corresponding in size and shape to said enlarged throat portion of said groove to provide a locking engagement between said tongue and said groove when said tongue is inserted into said groove.

4. A self fastening guide as claimed in claim 3 and wherein said pair of fingers are sized to fit within the opening in the rail to prevent said fingers from spreading apart and releasing said tongue from its locked engagement within said groove when said tongue and said groove are coupled together within the opening.

5. A self fastening guide as claimed in claim 1 and wherein said first and second guide members are cupped toward said mounting surface of said guide members prior to the attachment of said first and second guide members to the rail and wherein the cupped first and second guide members are flattened and held against the surface of the rail when said guide is attached to the rail.

6. A self fastening guide as claimed in claim 1, wherein the mounting surfaces of said first and second guide members are inwardly cupped prior to attachment to said rail and are flattened when said mounting surfaces engage said rail.

7. A guide for use with an elongated guide rail which forms a lane along which beverage containers travel within a beverage container packaging machine, said guide extending along the length of said guide rail to reduce friction between the guide rail and beverage containers moving along said guide rail and consisting of a first guide member extending along one side of said guide rail and a second guide member extending along the opposing side of said guide rail, said first guide member having contoured fingers for insertion within an opening formed in the guide rail and said second guide member having a tongue for insertion within said opening, said tongue being received between said fingers within the opening in the guide rail to secure the first and second guide members to the guide rail.

8. The improvement of claim 7 and wherein said pair of fingers are sized to fit sufficiently snugly within the guide rail opening to prevent said fingers from spreading apart and releasing the tongue of said second guide member from its locked relationship within said groove.

9. The improvement of claim 8 and wherein said first and second guide members are inwardly cupped prior to attachment to said guide rail and wherein said fingers and said tongue are sized to lock together within the opening in said guide rail when said guide members are substantially flattened against the surface of said guide rail.

10. A method of attaching a guide having first and second members to a guide rail having an opening formed therethrough and having articles traveling along either side of said guide rail, said method comprising the steps of:

(a) providing fingers on the first guide member and a tongue on the second guide member with the fingers and tongue sized to extend into the opening in said guide rail and to lock together when said tongue is inserted between said fingers;

(b) providing a bearing surface on a surface of said first and second members which opposes said fingers and tongue, said bearing surface for contacting said articles and having a low coefficient of friction;

(c) locating the first guide member on one side of the guide rail with the fingers extending through the opening in the guide rail;

(d) locating the second guide member on the other side of the guide rail with the tongue extending through the opening in the guide rail and between the fingers on the first guide member; and (e) pressing the first and second members of the guide together to lock the tongue to the fingers within the opening in the guide rail so as to attach the guide to the guide rail.

11. A guide for attachment to a guide rail having an opening formed through said guide rail and having articles traveling along one side of said guide rail, said guide comprising:

a first member having an inner surface for bearing against the one side of said guide rail and a bearing surface opposite said inner surface for contacting the articles traveling along said guide rail;

a second member having an inner surface for bearing against an opposite side of said guide rail as said one side; and means for fastening said inner surfaces of said first and second members to said guide rail, said fastening means comprising a pair of spaced finger for extending into said opening from one side of said guide rail and a tongue for extending into said opening from an opposite side of said guide rail with one of said pair of fingers or said tongue projecting from said inner surface of said first member and the other of said pair of fingers or said tongue projecting from said inner surface of said second member;

said first and second members being attached to said guide rail when said tongue is inserted into said opening and between said pair of fingers.

* * * * *